United States Patent [19]
Uchiyama et al.

[11] 3,994,007
[45] Nov. 23, 1976

[54] AUTOMATIC FLASH PHOTOGRAPHY APPARATUS

[75] Inventors: Takashi Uchiyama; Tadashi Ito, both of Yokohama; Mutsuhide Matsuda, Tokyo, all of Japan

[73] Assignee: Canon Kabushiki Kaisha, Tokyo, Japan

[22] Filed: Sept. 11, 1974

[21] Appl. No.: 504,894

Related U.S. Application Data

[63] Continuation of Ser. No. 318,471, Dec. 26, 1972, which is a continuation of Ser. No. 68,737, Sept. 1, 1970, abandoned.

[30] Foreign Application Priority Data

Sept. 9, 1969  Japan............................. 44-71470
Sept. 9, 1969  Japan............................. 44-71471
Oct. 7, 1969   Japan............................. 44-80060

[52] U.S. Cl.............................. 354/267; 354/230; 354/258
[51] Int. Cl.².......................................... G03B 17/38
[58] Field of Search ............ 354/230, 258, 259, 267

[56] References Cited
UNITED STATES PATENTS 2,218,252   10/1940   Stoiber............................. 354/244
3,072,028   1/1963    Lange................................ 354/36
3,400,645   9/1968    Kiper................................. 354/50
3,418,904   12/1968   Wick................................. 354/34
3,457,844   7/1969    Kitai................................. 354/32
3,535,989   10/1970   Kitai................................. 354/32

Primary Examiner—Monroe H. Hayes
Attorney, Agent, or Firm—Toren, McGeady and Stanger

[57] ABSTRACT

The disclosed automatic flash photography apparatus operates with a camera having a shutter in which a diaphragm blade serves as a shutter blade, and the diaphragm diameter is varied by varying the time interval from the moment its blades start opening till the moment they start closing. A switch switches over between separate time constant circuits, one for artificial-light photography, the other for natural-light photography. For flash photography, a resistor which is variable in response to the distance from a light source to an object and the film sensitivity controls the time constant circuits for closing the diaphragm blades. Thus a flash device is illuminated and the amount of light passing the diaphragm aperture is established.

1 Claim, 9 Drawing Figures

AUTOMATIC FLASH PHOTOGRAPHY APPARATUS

This is a continuation of application Ser. No. 318,471, filed on Dec. 26, 1972, which in turn is a continuation of Ser. No. 68,737 filed on Sept. 1, 1970, now abandoned.

The present invention relates to an automatic flash photography apparatus for a camera having a shutter in which a diaphragm blade serves as a shutter blade.

The principle of such an automatic flash apparatus involves setting a shutter speed at about 1/30 to 1/60 seconds and using mechanical or electrical signals of photographic information such as object's distance, film sensitivity and guide number, etc. to determine the diaphragm diameter and flashing while the shutter is open.

In contrast to the above type of flash apparatus the present invention lies in an automatic flash photographing apparatus which is characterized in that, a diaphragm diameter is varied by varying the time interval from the moment the blades start opening till the moment they start closing, and the time interval is controlled by the signal of photographic informations.

The present invention also lies in an automatic flash photography apparatus which is further characterized in that the diaphragm diameter is maintained for a predetermined length of time to produce a photograph with a long flash time.

The present invention is further characterized in that the diaphragm blades are opened at a constant speed, and the time interval for closing the diaphragm blades is controlled by photographic information such as object's distance, guide numbers etc. by a time constant circuit.

Further, the present invention is characterized in that the closing of the diaphragm blades for artificial light photographing is accurately effected by means of a circuit including a voltage source which is variable in response to the charging of a main capacitor in a separate flash device.

The present invention shall be described in detail with reference to the attached drawings in which.

Figure 4:
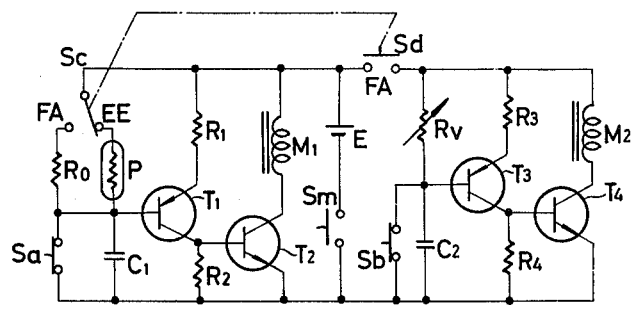
Figure 5:
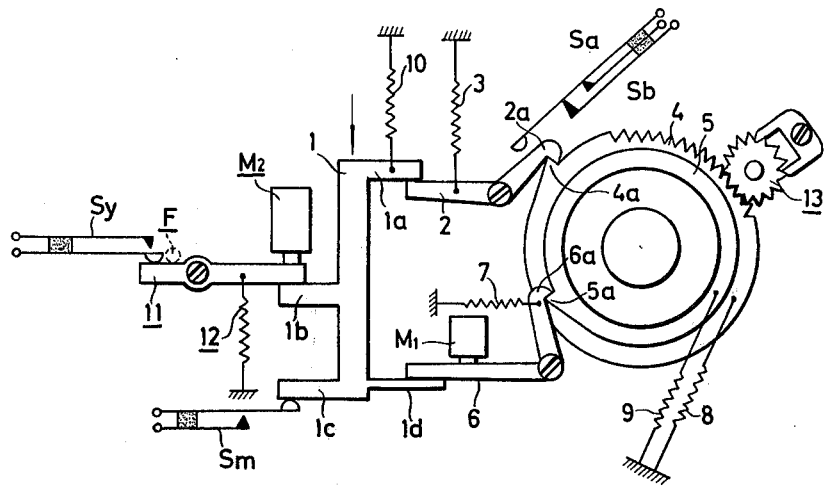
Figure 6:
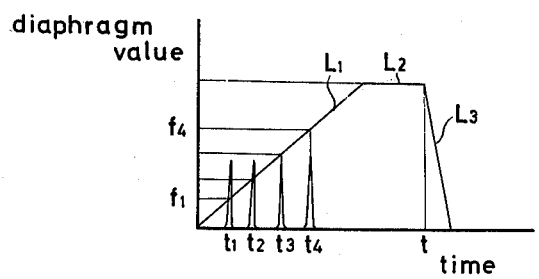

FIGS. 4–6 relate to another embodiment of the present invention.

FIG. 4 shows a circuit,

FIG. 5 is a schematic drawing of a shutter mechanism, and

FIG. 6 is a graph showing the relationship between the movement of shutter or diaphragm blades and the diaphragm value.

Figure 7:
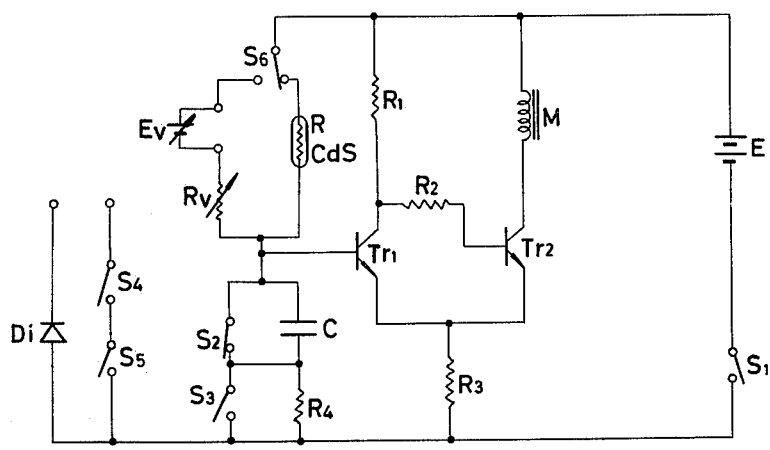
Figure 8:
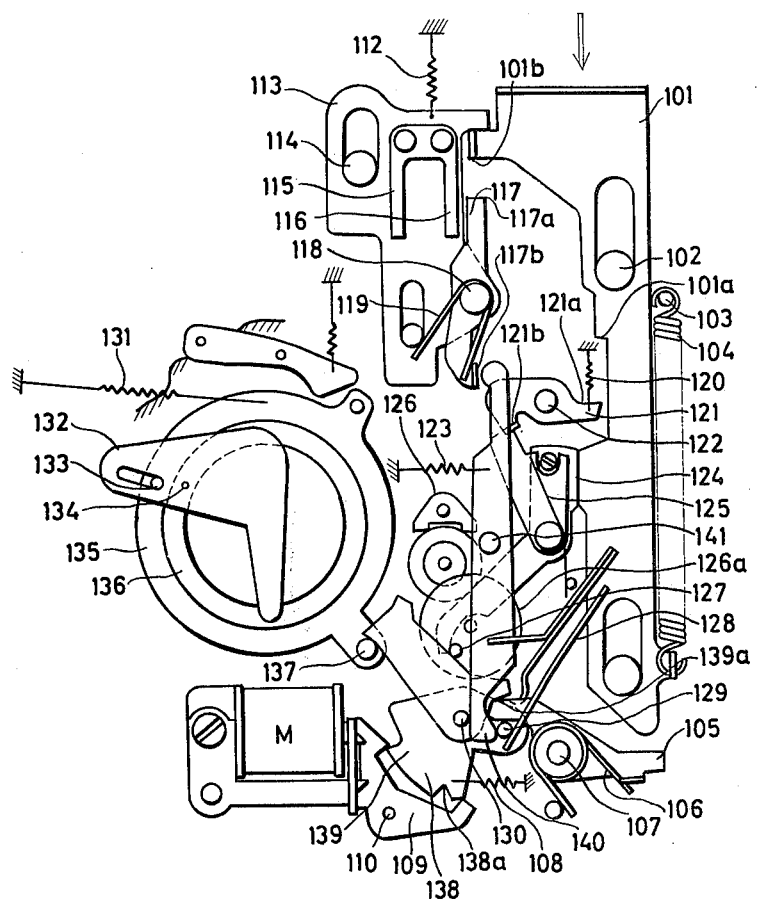

FIGS. 7 and 8 relate to still another embodiment of the present invention.

FIG. 7 shows a circuit for such embodiment and

FIG. 8 is a schematic drawing showing a shutter mechanism.

Figure 9:
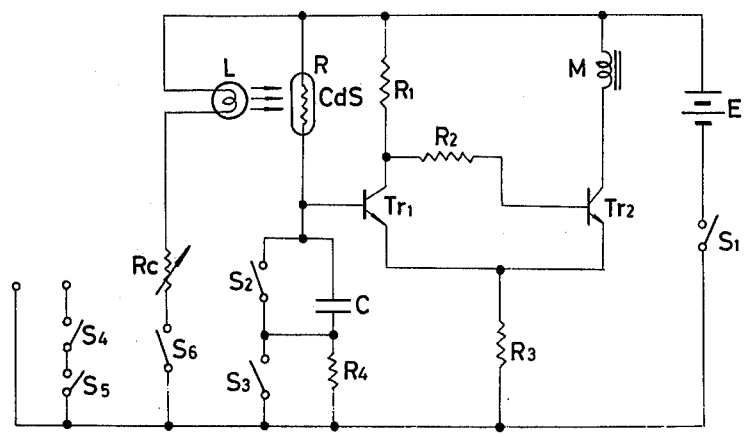

FIG. 9 is a circuit for a modified embodiment of the present invention.

Figure 3:
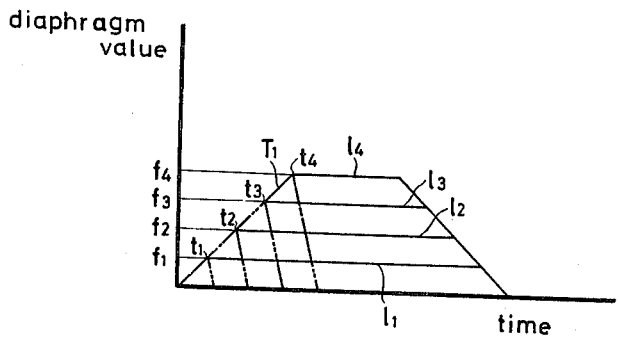
FIG. 3 is a graph showing the relationship between the movement of shutter or diaphragm blades and the diaphragm value.
Figure 2:
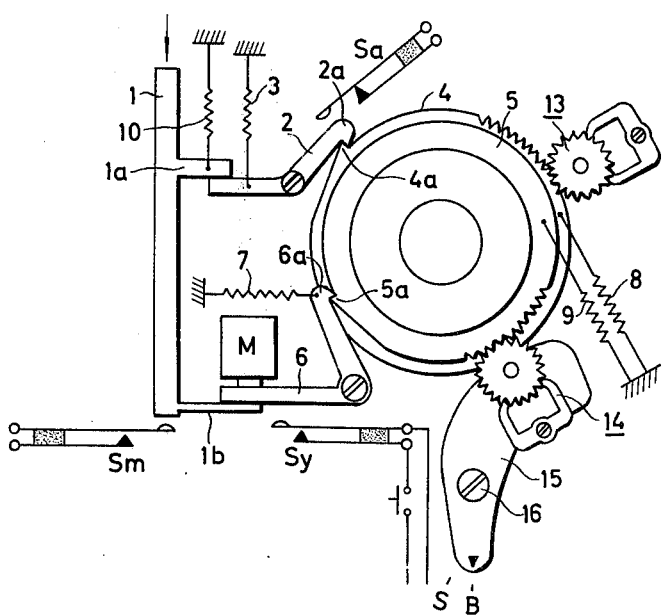
FIG. 2 is a schematic drawing of a shutter mechanism incorporated in one embodiment of the present invention.

In FIG. 2 when a shutter release bar 1 is pressed down, a release lever 2 rotates in a counterclockwise direction against a spring 3 and its hook 2a releases a release ring 4. The release ring 4 is then rotated in a clockwise direction by a spring 8. Thus the blades will be slowly opened under the control of a governer 13 as shown by a line $T_1$ in FIG. 3. As a closing lever 6 releases a closing ring 5 at the points $t_1$ to $t_4$ which lie in the course of the slow opening, blades will be quickly closed as shown by the dots dash lines if a governer 14 is not in a locking position.

The points $t_1$ to $t_4$ at which the blades are closed are controlled by the signal derived from photographic information. The closing lever 6 is released by a magnet M to allow the activation of the closing ring 5 and at the same time a flash synchronizing contact Sy is closed, for example by the closing lever 6, to flash an electronic flashing device. Then diaphragm values $f_1$ to $f_2$ are determined by the flash.

When using bulb photography with a long flash time, a lever 15 is rotated around the pivot 16 to a position as shown by the mark B to have the governer 14 engage the closing ring 5, the above-mentioned diaphragm values $f_1$ to $f_4$ are maintained for a predetermined length of time as shown by the full lines $l_1$, $l_2$, $l_3$ and $l_4$, thus it is possible to have the shutter synchronize with the bulb.

Figure 1:
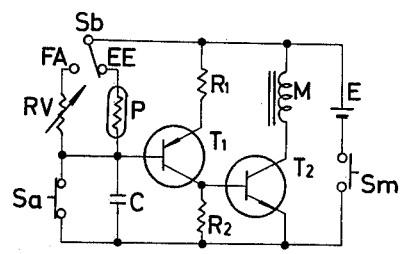
FIG. 1 is a circuit for one embodiment of the present invention.

FIG. 1 shows one example of a circuit diagram in which an electric circuit which performs the above function is incorporated into an EE photographing circuit. A switch Sb contacts FA during flash photography. As the release bar 1 is pressed down a main switch Sm is closed and a switch Sa for short-circuiting a capacitor C is opened by the action of the release lever 2. The magnet M is excited as transistors $T_1$, $T_2$ are placed in an on state to restrain the closing lever 6. A variable resistor RV, in which the object's distance, film sensitivity and guide number, etc. are set, and the capacitor C calculate the time. After a control time corresponding to the calculated time, transistors $T_1$, $T_2$ and the magnet M turn off, thus releasing the closing lever 6 and rotating closing ring 5. At the same time the flash synchronizing contact Sy is closed to trigger the electronic flash device and the diahragm values $f_1$ to $f_4$ are determined. At this time the time lag up to the flash peak can be compensated by closing the contact Sy earlier.

In bulb photography with long flash time, the opening of the blades can be maintained for the length of the burning time by activating the governor 14 in a manner as mentioned before.

In the above embodiment, photographic information are set into the resistor RV or the capacitor C as electric signals and are converted into a length of time. Then the diaphragm value at the time of flash photography is determined by the difference in the length of time. Therefore, compared to the conventional apparatus the present invention has the advantage that the apparatus can be simplified and made compact and its operation is much simpler.

In case of EE photography, the change over switch Sb is changed over to EE to dislocate the governor 14, thereby the circuit becomes an ordinary electric shutter circuit by using a photo-electric element P.

Another embodiment of the present invention is shown in FIGS. 4 to 6.

In FIG. 5, as the shutter release bar 1 is pressed down the release lever 2 rotates in a counter-clockwise direction and its hook 2a releases the release ring 4. The release ring 4 is rotated in a clockwise direction by the spring 8, while the governor 13 functions. The shutter blades will then be slowly opened as shown in FIG. 6. After an elapse of a predetermined length of time after said release, as the magnet $M_1$ is deenergized, the closing lever 6 is pulled by the spring 7 and is rotated in a counter-clockwise direction (at this time a return projection $1_d$ moves downward), and the shutter blades are closed by the closing ring 5 which is released from a hook 6a of the lever.

While the shutter blades make the opening and closing movement shown by the lines $L_1$, $L_2$ and $L_3$ in FIG. 6, the magnet $M_2$ is deenergized in response to signals of object's distance, film sensitivity and guide number, and the synchronizing lever 11 is linkedly moved in a clockwise direction by the spring 12, closing the synchronizing contact Sy, flashing the electronic flashing device in a manner as shown by $t_1$ to $t_4$, thus determining the diaphragm diameters $f_1$ to $f_4$.

FIG. 4 shows an example of an electric circuit performing the above-mentioned function, which is incorporated in an integrated manner with EE circuit. At the time of flash photography, the switches Sc-FA and Sd-FA are closed beforehand.

As the release bar 1 is pressed down, the main switch Sm is closed and the switches Sa, Sb for short-circuiting capacitors $C_1$, $C_2$ are opened by the release lever 2. As transistors $T_1$, $T_3$ are put in an on state, current will flow into transistors $T_2$, $T_4$, energizing magnets $M_1$ and $M_2$, thus restraining the closing lever 6 and the cynchronizing lever 11.

After an elapse of the time which is determined by a predetermined time element $C_1R_0$, the transistors $T_1$, $T_2$ are placed in an off state, deenergizing the magnet $M_1$ and closing the shutter blades. At the same time after an elapse of each of the times $t_1$ to $t_4$ which is determined by the time element $C_2R_V$ set by the above-mentioned signals photographic information signals, the transistors $T_3$, $T_4$ and the magnet $M_2$ are placed in an off state, releasing the synchronizing lever 11 and closing the cynchronizing contact Sy to flash the electronic flash device, thus determining the diaphragm values $f_1$ to $f_4$.

In EE photography the contact Sc is connected to EE and Sd-FA is opened, then the circuits for the transistors $T_1$, $T_2$ for flash are separated, thus forming an ordinary electric shutter circuit using a light receiving element P. At this time when the synchronizing lever 11 is restrained by a pin F, the synchronizing contact Sy will not move.

Still another embodiment of the present invention is shown in FIGS. 7 and 8.

In FIG. 7, E is a main power source, M is a magnet, RCdS is a photoresistor, Rv is a variable resistor which varies in response to the object distance and the film sensitivity. Ev is a voltage source which varies in response to guide number of the flashing device and the charging of a main capacitor in the flashing device, C is a capacitor for a time constant circuit for an electronic shutter, and $T_{r1}$ and $T_{r2}$ are transistors forming a known triggering circuit. The magnet M is connected between a collector of the transistor $T_{r2}$ and the anode of the main power source E.

A detailed explanation referring to FIG. 8 in combination with FIG. 7, follows.

When the shutter release bar 101 is pressed down as shown by an arrow, the switch $S_1$ is closed, while the other switches $S_2$ to $S_4$ are retained in the state shown in FIG. 7. When the switch $S_1$ is closed, a circuit connecting the photo-resistor RCdS which varies in response to the scene light and the resistor $R_4$ is formed. The partial voltage between the photo-resistor RCdS and the resistor $R_4$ is supplied to the base of the transistor $T_{r1}$. The transistors $T_{r1}$ and $T_{r2}$ are related such that the potential ($VBE_2$) between the base and the emitter of the transistor $T_{r2}$ is higher than the operating voltage of the transistor $T_{r2}$ when the potential ($VBE_1$) between the base and the emitters of the transistor $T_{r1}$ is lower than the operating voltage of the transistor $T_{r1}$.

Suppose the resistor $R_4$ is predetermined so that when the resistance of the photo-resistor RCdS is higher than a predetermined value (for example, a resistance value of RCdS for obtaining a proper photography at an exposure value of ev 8). The potential $VBE_1$ becomes lower than the operating voltage, the current flows through the magnet when the resistance of RCdS is lower than the predetermined value, and the member 138 is retained by the member 109 in the state shown in FIG. 8, the release lever is pressed down to engage the one end 101b of the release lever with one end 117a of the member 117. When the member 113, on which the member 117 is mounted, is pressed down together with the release lever 101 the contact members 115 and 116 also mounted on the member 113 are moved to change over the switch $S_6$ from the photo-resistor ROdS to the side of Ev and Rv, and to close the switch $S_4$ thereby rendering the camera ready for flash photography.

When the release lever 101 is further pressed down, the stepped portion 101a of the lever 101 is engaged with one end 121a of the hook lever 121. When the lever 101 is still further pressed down the end 121b of the hook lever 121 is disengaged with the lever 124 to allow the diaphragm blades to open. The opening of the diaphragm blades is controlled at a constant speed by a governer 126. The pin 127 on the gear 126a of the governer rotates the lever 124 in a clockwise direction against the spring 125. A pin 134 is mounted on the blade 132 and engages a fixed ring 136, a groove is provided on the blade 132. Another pin 133 mounted on the rotating ring 135 engages with groove. When the rotating ring 135 rotates in a clockwise direction, the blades open, and when the ring rotates in a counter-clockwise direction the blades close. The ring 135 is biased in a clockwise direction by a spring 131.

When the pin 127 on the gear of the governer 126 rotates, the pin 137 engages with the lever 139 and follows the rotation of the pin 127 to open the blades and to close a switch $S_3$ and open the switch $S_2$, thereby a time constant circuit including the voltage source Ev, the variable resistor Rv and the capacitor C is formed. The voltage source Ev and the resistor Rv respond to the object distance, the guide number and the film sensitivity etc. After a predetermined time when the potential $VBE_1$ reaches the operating voltage, the current supply to the magnet is interrupted to release the lever 109 from the attraction of the magnet M, and the lever 138 is rotated in a counter-clockwise direction by the spring 108 to engage the pin 129 with the end 139a of the lever 139. The lever 139 is thereby rotated around the axis 130 in a counterclockwise direction to close the blades through the pin 137 of the rotating ring 135. At this time, the pin 129 closes the contact 128 of the switch $S_5$, which is normally open, to trigger the flash.

The above functions are obtained when the resistance of the photo-resistor RCdS is higher than the predetermined value (for example, a resistance value for the exposure of Ev 8).

In contrast, when the resistance of RCdS is lower than the predetermined resistance value, the current is supplied to the magnet M, and when the release lever is pressed down the lower end of the lever engages the lever 105 to rotate the lever 105 in a clockwise direction. The pin 129 follows the rotation of the lever 105 and the lever 138 is rotated in a counter-clockwise direction by the spring 108. When the lever 109 engages the concave portion 138a of the lever 138 the switch $S_3$ is closed by a member not shown so that the potential $VBE_1$ becomes lower than the operating voltage and the current is supplied to the magnet M to retain the lever 138 with the lever 109. The latter is engaged with the concave portion 138a. At this time the pin 129 also rotates, the lever 140 follows the rotation of the pin 129 and rotates around the axis 141 in a counterclockwise direction and the upper end of the lever 140 engages the lower end 117b of the lever 117 to rotate the lever 117 around the axis 118 in a clockwise direction so that even when the release lever 101 is pressed down, its end 101b does not engage the upper end 117a of the lever 117. Thus the diaphragm blades are opened or closed with the switches $S_4$ and $S_6$ being retained in the state shown in FIG. 7 without being changed over. Therefore the opening and closing of the blades accomplished without flashing of the flashing device.

FIG. 9 shows a circuit diaphragm for a modified embodiment of the present invention in which a photo-resister RCdS serves also as a resistor for the time constant circuit for both of the natural light photography and artificial light photography. In FIG. 9, Rc is a variable resistor which varies in response to photographing informations such as object distance, guide number etc. and L is a lamp connected in series with the resistor Rc. $S_6$ is a change-over switch which functions in a similar way to the switch $S_6$ in FIG. 7. When the resistance of the photoresistor RCdS is higher than a predetermined value, the switch $S_6$ is closed by pressing down the release lever to illuminate the lamp. The the photo-resistor RCdS receives the light. The brightness of the lamp L is controlled by adjustment of the resistor Rc and the resistance of the photo-resistor RCdS in the time constant circuit is determined by the photographic information; thereby the timing of flashing for the flash photography is given and a proper exposure corresponding to object distance, guide number etc. is attained.

In a practical application of the above circuit, it be desirable that the photo-resistor is arranged facing the scene light so as to receive both the scene light and the light of the lamp, and that a half-mirror be arranged in front of the photo-resistor at a certain angle to the scene light so that the light of the lamp may be reflected on the half-mirror and fall onto the photo-resistor.

What is claimed is:
1. A control apparatus for operating a flash attached to a camera with a shutter controlled diaphragm, comprising shutter opening means, shutter closing means, circuit means responsive to said shutter opening means and coupled to said shutter closing means for initiating operation of said shutter closing means after a selected time period, trigger means responsive to operation of said closing means for producing a signal to operate the flash, and variable control means in said circuit means for varying the selected time on the basis of at least the distance between the camera and the object to be photographed, said circuit means including operating means responsive to said control means for initiating the operation of said shutter closing means, photosensitive means responsive to the scene being photographed, and switch means having two positions; switchable time constant means including second control means, said switch means, and said photosensitive means, and coupled to said operating circuit for actuating said operating means at selected times in response to the scene being photographed when said switch means is in one position and in response to the variation of said second control means when the switch means is in the other position, said time constant means including a capacitor forming a time constant circuit with said photosensitive means, said variable control means including lamp means whose illumination responds at least to the distance between the camera and the object being photographed and positioned to illuminate said photo-sensitive means, said switch means alternately connecting said lamp means into and out of operation.

* * * * *